(12) United States Patent
Chang et al.

(10) Patent No.: US 10,141,818 B2
(45) Date of Patent: Nov. 27, 2018

(54) WINDING FRAME STRUCTURE FOR MOTORS

(71) Applicant: INDUSTRIAL TECHNOLOGY RESEARCH INSTITUTE, Hsin-Chu (TW)

(72) Inventors: Jih-Yang Chang, Taoyuan (TW); Han-Ping Yang, Hsinchu (TW); Chau-Shin Jang, Hsinchu County (TW); Shin-Tien Yeh, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 326 days.

(21) Appl. No.: 14/974,546

(22) Filed: Dec. 18, 2015

(65) Prior Publication Data

US 2017/0085156 A1 Mar. 23, 2017

(30) Foreign Application Priority Data

Sep. 18, 2015 (TW) .............................. 104131020 A (51) Int. Cl.
*H02K 3/30* (2006.01)
*H02K 3/32* (2006.01)
*H02K 9/22* (2006.01)

(52) U.S. Cl.
CPC .................. *H02K 9/22* (2013.01); *H02K 3/30* (2013.01); *H02K 3/325* (2013.01)

(58) Field of Classification Search
CPC ............ H02K 9/22; H02K 3/30; H02K 3/325; H02K 3/32; H02K 3/34; H02K 3/345; H02K 2203/12

(Continued)

(56) References Cited

U.S. PATENT DOCUMENTS 1,895,776 A * 1/1933 Stolp .......................... H01F 5/02
242/118.4
3,105,786 A * 10/1963 Anderson ............... B29C 53/60
138/144

(Continued)

FOREIGN PATENT DOCUMENTS

CN 101939897 A 1/2011
CN 102396138 A 3/2012

(Continued)

OTHER PUBLICATIONS

Intellectual Property Office, Ministry of Economic Affairs, R.O.C., "Office Action", dated May 5, 2016, Taiwan.

(Continued)

*Primary Examiner* — Bernard Rojas
*Assistant Examiner* — Ahmed Elnakib
(74) *Attorney, Agent, or Firm* — Locke Lord LLP; Tim Tingkang Xia, Esq.

(57) ABSTRACT

A winding frame structure for an automation winding machine to conveniently produce the windings of a motor includes two barrier plates, four ceramic heat conductive structures with high heat conductivity, and special-structured grooves. The ceramic heat conductive structures can significantly enlarge the heat dissipation area of the windings. The heat generated by the windings can be swiftly transmitted firstly to the ceramic heat conductive structures, then to the stator inside a space formed by assembling the four ceramic heat conductive structures, and finally to a motor casing. An air-cooling or water-cooling apparatus is introduced to swiftly dissipate the heat at the motor casing. Provided by the winding frame structure, the temperature difference between the inside and the outside of the winding frame structure can be reduced, the heat dissipation process can be more efficiently, and the winding arrangement of the windings for motors can be conveniently performed.

7 Claims, 6 Drawing Sheets

(58) Field of Classification Search
USPC .......... 310/194, 214, 215, 54; 336/198, 199, 336/207, 209
See application file for complete search history.

(56) References Cited

U.S. PATENT DOCUMENTS

| | | | |
|---|---|---|---|
| 3,108,763 A * | 10/1963 | Ahlene | H01F 5/02 242/118.4 |
| 3,352,509 A * | 11/1967 | Kort | H01F 5/02 242/118.4 |
| 3,705,253 A * | 12/1972 | Hicks | F27D 11/02 219/390 |
| 4,329,606 A | 5/1982 | Montagu | |
| 4,362,512 A | 12/1982 | Johnson | |
| 5,023,733 A | 6/1991 | Koga et al. | |
| 5,659,217 A | 8/1997 | Petersen | |
| 5,767,592 A | 6/1998 | Boys et al. | |
| 5,818,131 A | 10/1998 | Zhang | |
| 5,825,108 A | 10/1998 | De Filippis | |
| 5,874,796 A | 2/1999 | Petersen | |
| 6,181,530 B1 | 1/2001 | Ratliff et al. | |
| 6,246,140 B1 | 6/2001 | Horng | |
| 6,265,797 B1 | 7/2001 | Horng | |
| 6,285,108 B1 | 9/2001 | Horng | |
| 6,362,718 B1 | 3/2002 | Patrick et al. | |
| 6,376,947 B1 | 4/2002 | Tateishi | |
| 6,400,054 B1 | 6/2002 | Horng | |
| 6,498,412 B2 | 12/2002 | Horng | |
| 6,566,779 B2 | 5/2003 | Takano et al. | |
| 6,597,138 B2 | 7/2003 | Fitzgibbon | |
| 8,675,378 B2 | 3/2014 | Beland | |
| 2005/0023909 A1* | 2/2005 | Cromas | H02K 9/19 310/58 |
| 2005/0035680 A1 | 2/2005 | Murakami et al. | |
| 2006/0022550 A1* | 2/2006 | Otsuji | H02K 3/325 310/194 |
| 2007/0080599 A1 | 4/2007 | Telep et al. | |
| 2007/0188280 A1 | 8/2007 | Park et al. | |
| 2007/0228846 A1 | 10/2007 | Rao | |
| 2012/0025636 A1* | 2/2012 | Roopnarine | H02K 1/02 310/46 |

FOREIGN PATENT DOCUMENTS

| | | |
|---|---|---|
| CN | 102629792 A | 8/2012 |
| CN | 204205774 U | 3/2015 |
| TW | 380329 B | 1/2000 |
| TW | 497782 U | 8/2002 |
| TW | 200601668 | 1/2006 |
| TW | 200701270 | 1/2007 |
| TW | 200822495 A | 5/2008 |
| TW | I304321 B | 12/2008 |
| TW | 200910732 A | 3/2009 |
| TW | I310660 B | 6/2009 |
| TW | I313014 B | 8/2009 |
| TW | I325212 B | 5/2010 |
| TW | M395896 U | 1/2011 |
| TW | 201223082 A | 6/2012 |
| TW | 201225482 A | 6/2012 |
| TW | I372502 | 9/2012 |
| TW | I422121 B | 1/2014 |
| TW | 201434243 A | 9/2014 |

OTHER PUBLICATIONS

Dorrell, D.G. et al., A Review of the Design Issues and Techniques for Radial-Flux Brushless Surface and Internal Rare-Earth Permanent-Magnet Motors, IEEE Transactions on Industrial Electronics, 2011, 3741-3757, vol. 58, Issue: 9.

Jack, Alan et al., Design and Testing of a Universal Motor Using a Soft Magnetic Composite Stator, IEEE, 2000, 46-50.

Smith, A. C. et al., Performance of Line-Start Single Phase Permanent Magnet Motors for Domestic Applications, IEEE, 1996, 503-510.

Jun-Young Lim et al., High Efficiency and Low-Cost Switched Reluctance Motor for Air-conditioner Blower, IEEE, 2002,1460-1467.

Fussell, B.K., Analysis and performance comparison of a tooth wound brushless CPU cooling fan motor, IEEE, 2003, 379-386.

Yamanaka, A. et al., Coil Bobbin Composed of High-Strength Polyethylene Fiber Reinforced Plastics for a Stable High-Field Superconducting Magnet, Physica C, 2002, 372-376, 1447-1450.

Mattia Morandin et al., Design and performance of a power train for mild-hybrid motorcycle prototype, IEEE International Electric Machines & Drives Conference (IEMDC), 2013, 1-8.

T. Sugaiwa et al., New Visco-Elastic Mechanism Design for Flexible Joint Manipulator, Proceedings of IEEE/ASME International Conference on Advanced Intelligent Mechatronics, 2008, 235-240.

SIPO State Intellectual Property Office, "Office Action", dated Aug. 3, 2018, China.

* cited by examiner

WINDING FRAME STRUCTURE FOR MOTORS

CROSS REFERENCE TO RELATED APPLICATION

The present application is based on, and claims priority from, Taiwan (International) Application Serial Number 104131020, filed on Sep. 18, 2015, the disclosure of which is hereby incorporated by reference herein in its entirety.

TECHNICAL FIELD

The present disclosure relates to a winding frame structure for motors, and more particularly to an integrated winding frame structure with high thermal-conductive materials formed as a single piece or an assembly that can reduce the thermal resistance between copper wires and the stator by providing integrated insulation members for windings, and also by including special-structured grooves for ceramic heat conductive plates with high thermal conductivity. By having the winding frame structure for motors in this disclosure, the thermal contact resistance between the coppers and the stator can be significantly reduced, and a convenient winding arrangement for windings can be provided to the automation winding machine. In addition, in this disclosure, two barrier plates made of insulation materials are included, and the inner side of the windings includes plural ceramic heat conductive plates.

BACKGROUND

Recently, the disk motor with a high power density or a high torque density has become the mainstream product in the related applications. For example, a heavy-duty scooter equipped with a mild hybrid power system has an engine and a generator/motor device like an integrated starter generator (ISG) on a range-extended electric vehicle.

The ISG is operated under a high torque density for starting or auxiliary accelerating. Generally, the ISG is operated as a motor at a percentage higher than 70% and as a generator at a percentage lower than 30% [1]. However, serious problems existing for installing the ISG or the like system include the demand in a larger accommodation space and the difficulty in heat dissipation.

In the art, the heat-dissipation methods for the integrated generators include mainly the water-cooling system and the air-cooling system. In particular, the water-cooling system is mainly designed to cool down the casing of the generator so as thereby to dissipate the heat generated by the heated copper wires and transferred to the stator.

On the other hand, the air-cooling system consisted of a plurality of heat-dissipation fins outside around the casing of the generator, a sleeve for forming a wind tunnel to include all the fins and a fan for generating an enforced airflow through the wind tunnel is to dissipate rapidly the heat generated by the generator. According to the theory of heat convection, the heat-convective coefficient for a liquid-state flow is about 100~10000 W/m2K, while that for a gas-state flow is about 50~250 W/m2K. Thus, by compared to the air-cooling system, the water-cooling system may provide a better heat-dissipation capacity. However, in a loading test upon a heavy-duty motorcycle equipped with a micro hybrid power system, the generator cooled by a water-cooling system may still have a temperature high to 120~140° C. and an external temperature high to 80~100° C. The temperature difference as above in between is obvious as high as 40° C. It implies that ill heat conduction occurs inside the generator. Thereupon, service life of the generator and the peripherals would be terribly affected so as further to limit the operation time on the vehicle.

According to a thermal resistance analysis, it is found that the terrible heat-conductive capacity inside the generator is mainly due to the thermal resistance of the peek located between the copper wires (heat source) and the stator, which the peek has a heat-conductive coefficient of 0.25 W/mK, but provides 67% of the total thermal resistance. Thereupon, the heat generated inside the generator cannot be rapidly conveyed out to the casing, such that the accumulated heat would hit the main body of the generator. As a result, the performance of the generator would be downgraded, and the insulation of the generator would be jeopardized.

To resolve the problems located by the aforesaid analysis in the thermal resistance, a single-piece or assembly-type mechanism device of a winding frame and accompanying ceramic heat conductive plates is proposed in this disclosure. The ceramic heat conductive plates obtained through a systematic design process can significantly improve the heat dissipation area of the copper wires, and greatly increase the contact thermal conductivity between the copper wires and the stator. Thereby, the temperature difference at the generator can be substantially reduced, and the capacity in heat dissipation of the generator can be significantly increased. Thus, no matter whether the air-cooling or water-cooling system is applied, the aforesaid problems in heat dissipation of electric devices can be resolved to a great extent.

SUMMARY

Accordingly, it is the primary object of this disclosure to provide an integrated winding frame structure for motors with high thermal-conductive materials formed as a single piece or an assembly that can reduce the thermal resistance between the copper wires and the stator by providing integrated insulation members for windings, and also by including special-structured grooves for ceramic heat conductive plates with high thermal conductivity. By having the winding frame structure for motors in this disclosure, the thermal contact resistance between the coppers and the stator can be significantly reduced, and a convenient winding arrangement for windings can be provided to the automation winding machine. In addition, in this disclosure, two barrier plates made of insulation materials are included, and the inner side of the windings includes plural ceramic heat conductive plates.

Further, it is another object of this disclosure to provide the winding frame structure for motors furnished with special-structured grooves formed on the ceramic heat conductive plates, so that the heat dissipation area can be enlarged and the winding arrangement can be facilitated. Compared to the conventional high thermal resistance interface device having simply an insulation jacket, the winding frame structure can rapidly conduct the heat generated by the copper wires to the silicon-steel plates and further to the casing of the motor; such that, with relevant cooling system arrangement upon the motor of this disclosure, the limited heat-dissipation capacity on the conventional air-cooled or water-cooled motor can substantially improved.

In this disclosure, the winding frame structure for motors comprises:

two barrier plates, each of the two barrier plates having an engaging structure locating on a surface thereof facing the opposing barrier, the engaging structure further including four anchorage grooves;

an insulation member, formed by four ceramic heat conductive structures, located between the two barrier plates, both ends of each of the four ceramic heat conductive structures being engaged with the corresponding engaging structures of the two barrier plates so as to form respective fixed engagement; and windings, wound around the four ceramic heat conductive structures between the two barrier plates;

wherein an inner rectangular space for accommodating a stator is formed by the four ceramic heat conductive structures.

Preferably, each of the two barrier plates is made of an insulation material.

Preferably, each of the ceramic heat conductive structures is made of a material selected from a group of a ceramics, a graphite and a silicon glue.

Preferably, a surface of each of the four the ceramic heat conductive structures facing the windings includes one of a parallel rectangular groove structure and a parallel wavy groove structure.

Preferably, a heat-dissipation pathway for transmitting heat generated by the windings is established in order by including the insulation member, the stator and a motor casing. Further, one of an air-cooling apparatus and a water-cooling apparatus for generating a flow to dissipate the heat is applied to the motor casing.

Preferably, the engaging structure includes anchorage grooves for engaging the respective ends of the four ceramic heat conductive structures so as thereby to form integrally a hollow rectangular cylinder by engaging the two barrier plates and the four ceramic heat conductive structures.

Preferably, the engaging structure further includes four protrusive members protruding toward a center of the corresponding barrier plate formed as a hollow rectangular frame structure, the four protrusive members being distributed to four inner corners of a hollow rectangular space of the corresponding barrier plate, three rivets being located to a root of each of the four protrusive members, each end of the four ceramic heat conductive structures being held between two neighboring protrusive members, a clip for providing elastic lateral compressive forcing upon the corresponding end of the respective ceramic heat conductive structure being introduced to be located in place at the root of the protrusive member with a restraint structure formed by the three rivets, such that a hollow rectangular cylinder is formed integrally by engaging the two barrier plates and the four ceramic heat conductive structures.

Preferably, in the hollow rectangular cylinder formed by assembling the four ceramic heat conductive structures, any two neighboring sides of the four ceramic heat conductive structures are not tightly contacted.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
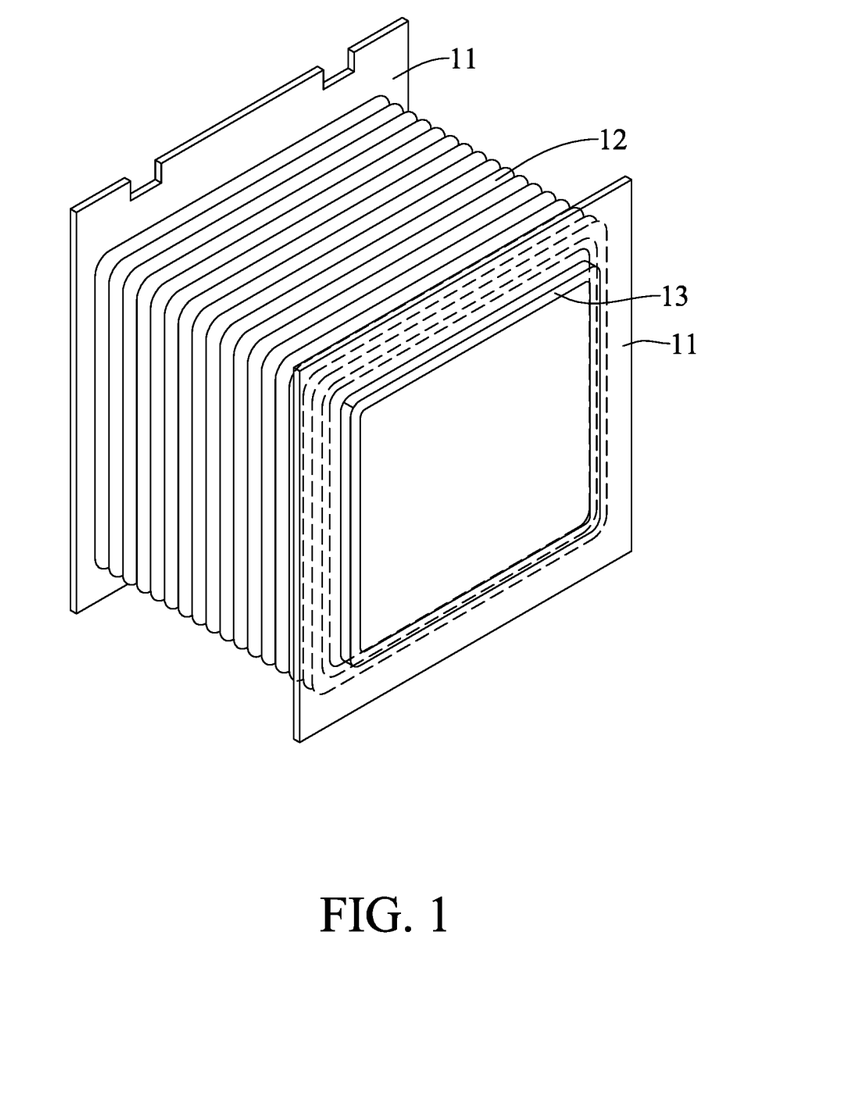
FIG. 1 is a schematic perspective view of the preferred winding frame structure for motors in accordance with this disclosure.

Referring now to FIG. 1, a schematic perspective view of the preferred winding frame structure for motors in accordance with this disclosure is shown. This disclosure aims particularly at the thermal resistance between the copper wires and the stator of the electric generator, and provides an integrated winding insulation member structure for significantly reducing the contact thermal resistance between the copper wires and the stator by introducing special-structured grooves formed on a ceramic heat conductive plate with high thermal conductivity. Thus, winding arrangement of the copper wires performed by an automation winding machine can be better facilitated. In the structure of this disclosure, two barrier plates 11 can be made of a Peek (an insulation plastic material), and four ceramic heat conductive structures located inside the windings 12 are embodiment as four individual ceramic heat conductive plate (i.e. ceramic thermal pad) made of a ceramic material, a graphite, a silicon glue or any the like. The four ceramic heat conductive structures are integrated or assembled to form an insulation member 13, particularly in a form of a hollow rectangular cylinder. With the two barrier plates 11 to seal both ends of the insulation member 13, the whole assembly of the four ceramic heat conductive structures and the two barrier plates 11 can thus present the winding frame structure with a high thermal conductivity in accordance with this disclosure.

Figure 2:
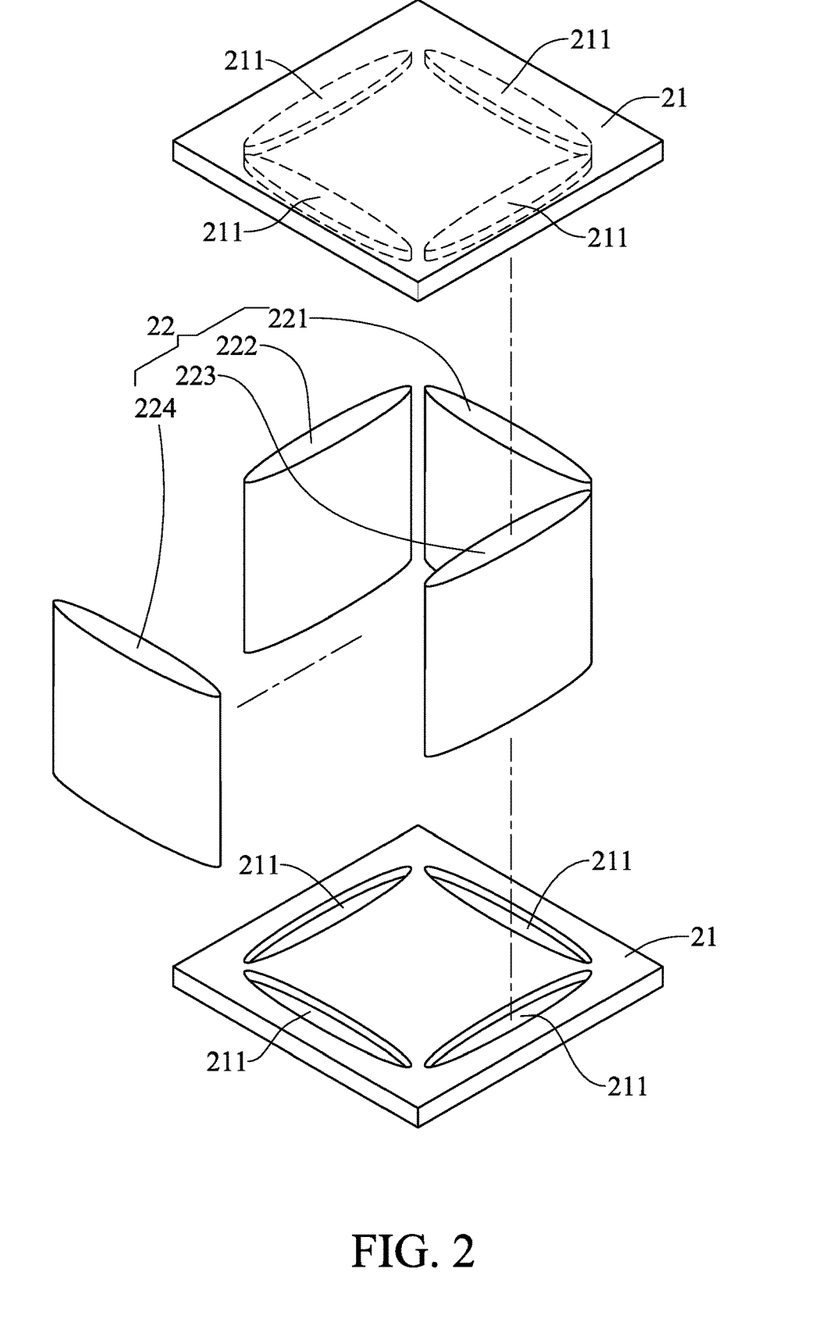
FIG. 2 is an exploded view of a first embodiment of the assembly of two barrier plates and four ceramic heat conductive structures in accordance with this disclosure.

Referring now to FIG. 2, an exploded view of a first embodiment of the assembly of two barrier plates 21 and four ceramic heat conductive structures 221, 222, 223, 224 in accordance with this disclosure is shown. Each of the two barrier plates 21 having an engaging structure on the inner surface facing the opposite barrier plate 21. In the embodiment of FIG. 2, the engaging structure is embodied as four anchorage grooves 211. The four ceramic heat conductive structures 221, 222, 223, 224 are used to form an insulation member 22 to be held in place between the two barrier plates 21. Each of ends of the four ceramic heat conductive structures 221, 222, 223, 224 is engaged with the corresponding engaging structure on the respective barrier plate 21. Namely, each end of the ceramic heat conductive structure 221, 222, 223 or 224 is engaged with one corresponding anchorage groove 211 of the barrier plate 21 so as integrally to form a fixed engagement. The windings 12 (FIG. 1), or said the copper wires, are to wind around outer surfaces of the four ceramic heat conductive structures 221, 222, 223, 224. The internal rectangular space formed by assembling the four ceramic heat conductive structures 221, 222, 223, 224 is used to accommodate the stator (see FIG. 5). In this disclosure, the hollow rectangular cylinder 22 (i.e. the insulation member) consisted of the four ceramic heat conductive structures 221, 222, 223, 224 is solidly formed by engaging ends of the ceramic heat conductive structures 221, 222, 223, 224 with the corresponding anchorage grooves 211 of the respective engaging structures of the barrier plates 21.

Figure 3A:
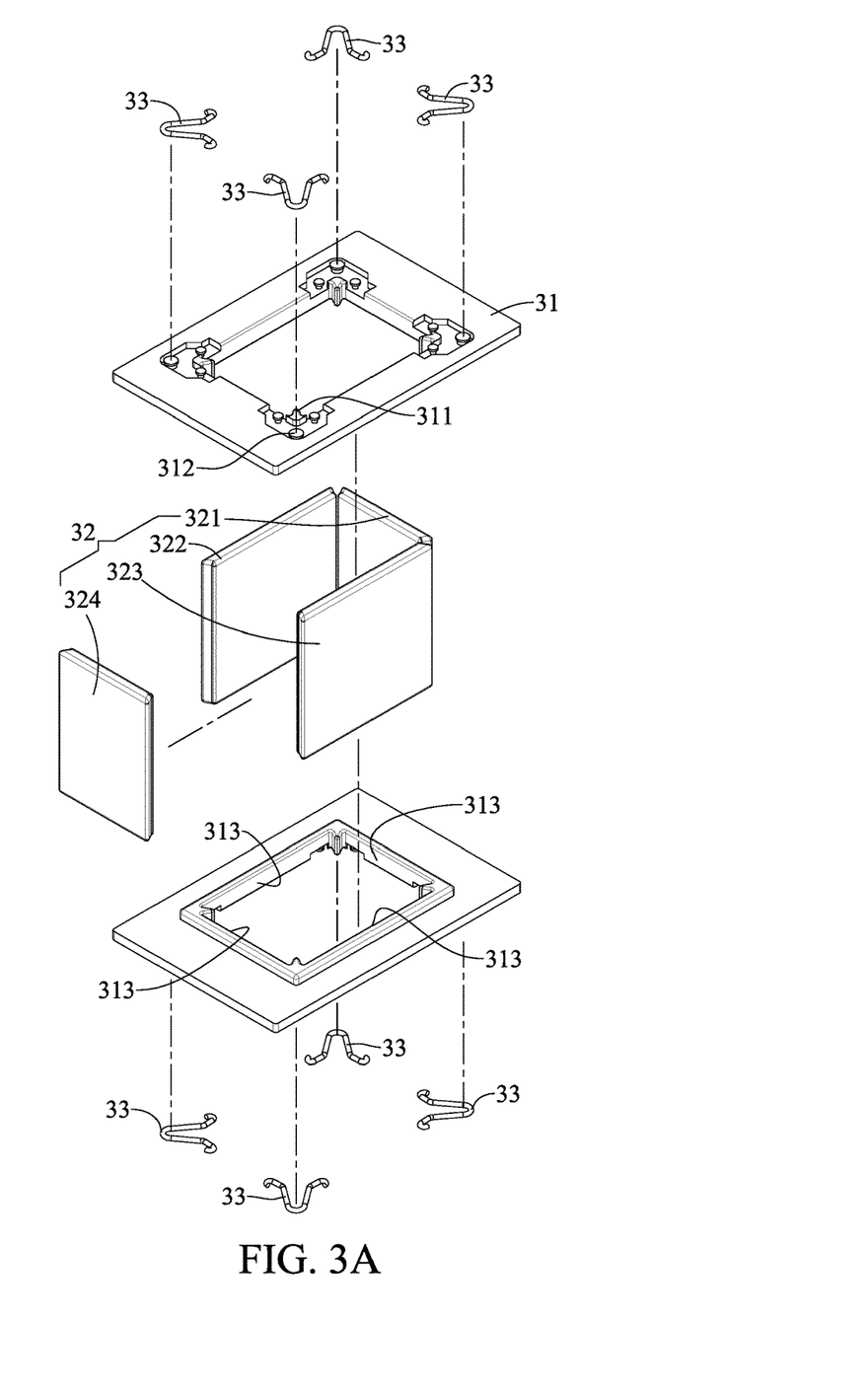
FIG. 3A is an exploded view of a second embodiment of the assembly of two barrier plates and four ceramic heat conductive structures in accordance with this disclosure.
Figure 3B:
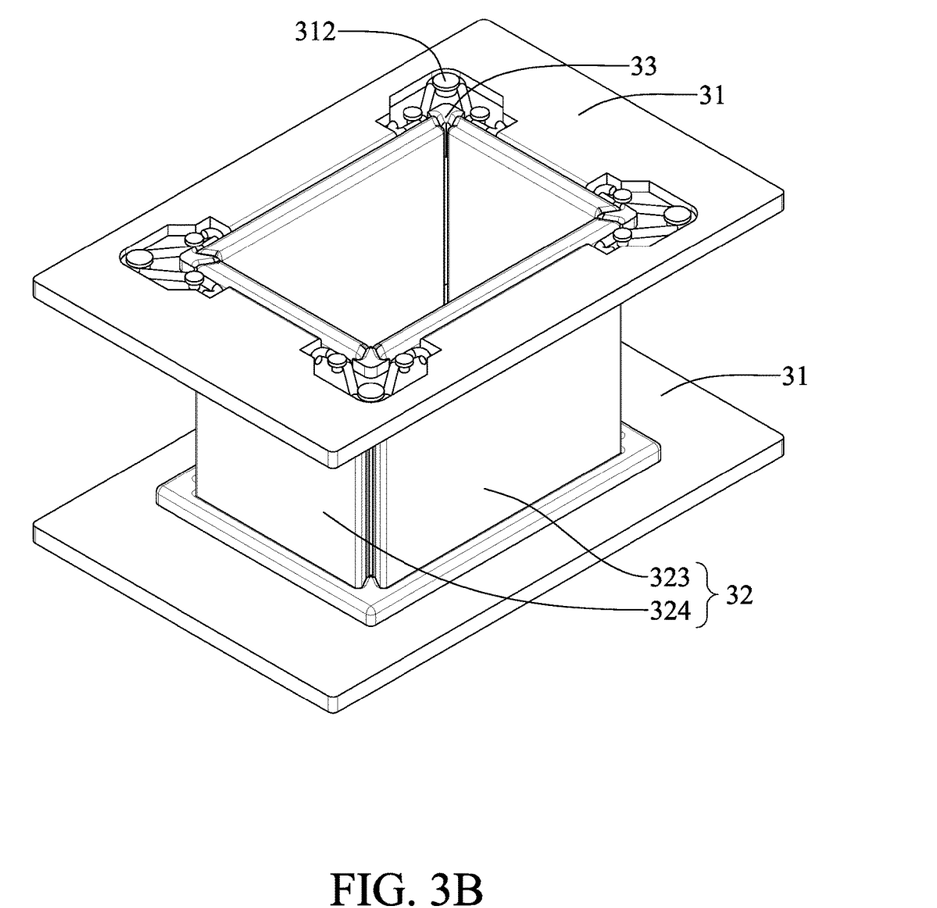
FIG. 3B is a perspective view of FIG. 3A.

Referring now to FIG. 3A and FIG. 3B, an exploded view and its perspective view of a second embodiment of the assembly of two barrier plates 31 and four ceramic heat conductive structures 321, 322, 323, 324 in accordance with this disclosure are shown, respectively. Each of the barrier plates 31 includes an engaging structure consisted of four anchorage grooves 313 located on the inner surface facing the opposite barrier plate 31. An insulation member 32 consisted of the ceramic heat conductive structures 321, 322, 323, 324 is assembled and held in place by and between the two barrier plates 31. In this embodiment, the barrier plate 31 is formed as a hollow rectangular frame. Both ends of each the ceramic heat conductive structure 321, 322, 323 or 324 engage with the respective barrier plates 31 at the corresponding engaging structures, and thus corresponding fixed engagement in between is formed. The windings 12 (FIG. 1) are wound there-outside around the four ceramic heat conductive structures 321, 322, 323, 324, and the stator is to be mounted inside a rectangular space formed by the four ceramic heat conductive structures 321, 322, 323, 324. Each engaging structure of the two barrier plates 31 includes four protrusive members 311, preferably located at four inner corners thereof, protruding toward a center of the hollow barrier plate 31. At the root of each protrusive member 311, three rivets 312 are located. Upon such an arrangement, the four protrusive members 311 are distributed to four inner corners of the hollow rectangular space of the barrier plate 31, and each single ceramic heat conductive structure 321, 322, 323 or 324 are held in between, preferably in a buckling manner, by two neighboring protrusive members 311, precisely into the corresponding anchorage groove 313 between the neighboring protrusive members 311. In addition, a clip 33 for providing elastic lateral compressive forcing upon corresponding end of the respective ceramic heat conductive structure 321, 322, 323 or 324 is introduced to be located in place at the root of the protrusive member 311, with a restraint structure formed by the three rivets 312. Thus, a fixed engagement is formed between the two barrier plates 31 and the four ceramic heat conductive structures 321, 322, 323, 324. In this embodiment, the four ceramic heat conductive structures 321, 322, 323, 324 are held together by the two barrier plates 31 so as to form a hollow rectangular cylinder 32 (i.e. the insulation member). In this hollow rectangular cylinder 32, the neighbor sides of the two perpendicular ceramic heat conductive structures (321, 322, 323, 324) are not tightly contacted, such that round corners of the windings 12 can be formed while in winding the copper wires around the hollow rectangular cylinder 32 structured by the four ceramic heat conductive structures 321, 322, 323, 324.

Figure 4A:
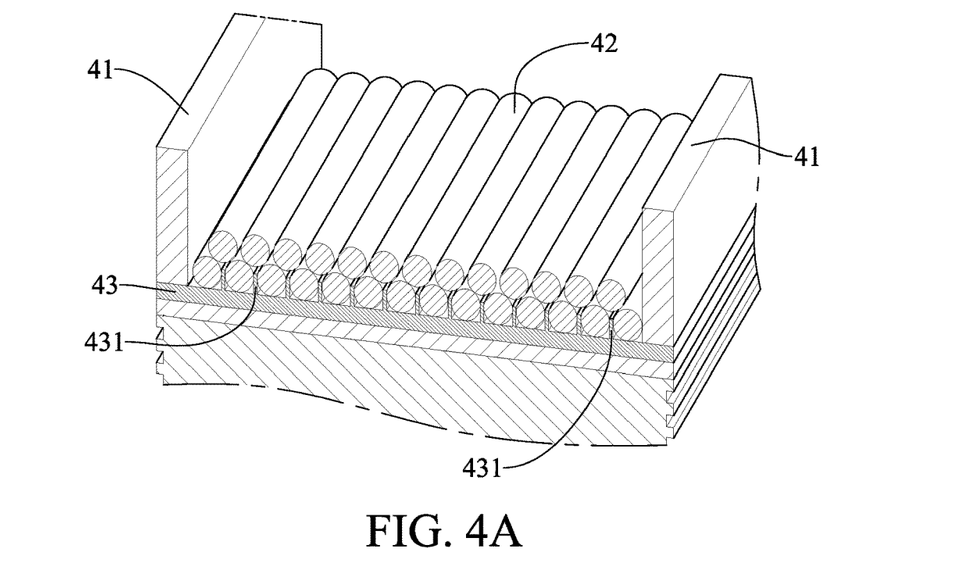
FIG. 4A demonstrates schematically an application of a parallel rectangular groove structure on a surface of the ceramic heat conductive structure in accordance with this disclosure.
Figure 4B:
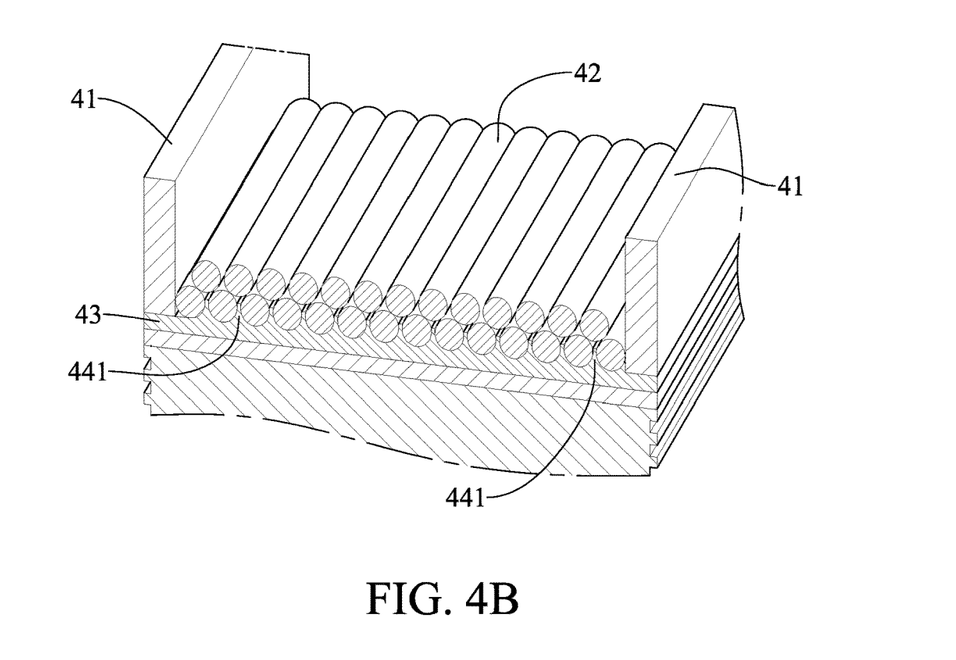
FIG. 4B demonstrates schematically an application of a parallel wavy groove structure on a surface of the ceramic heat conductive structure in accordance with this disclosure.

Referring now to FIG. 4A and FIG. 4B, applications of a parallel rectangular groove structure 431 and a parallel wavy groove structure 441 on the surface of the ceramic heat conductive structure 43 or 44 in accordance with this disclosure are schematically shown, respectively. As shown, a surface of the ceramic heat conductive structure 43 or 44 with a high thermal conductivity for winding the copper wires to form the windings 42 is constructed with a parallel rectangular groove structure 431 or a parallel wavy groove structure 441, respectively. At both ends of the windings 42, two corresponding barrier plates 41 are applied to form as stops to the winding operation. Upon such an arrangement, the automation winding machine can be easier to perform the winding arrangement of the copper wires (i.e. the windings 42). Also, the windings 42 can be present with a higher winding density so as to reduce the volume of the whole windings 42, to enlarge the contact area within the windings 42, and to improve the related heat dissipation capacity.

Figure 5:
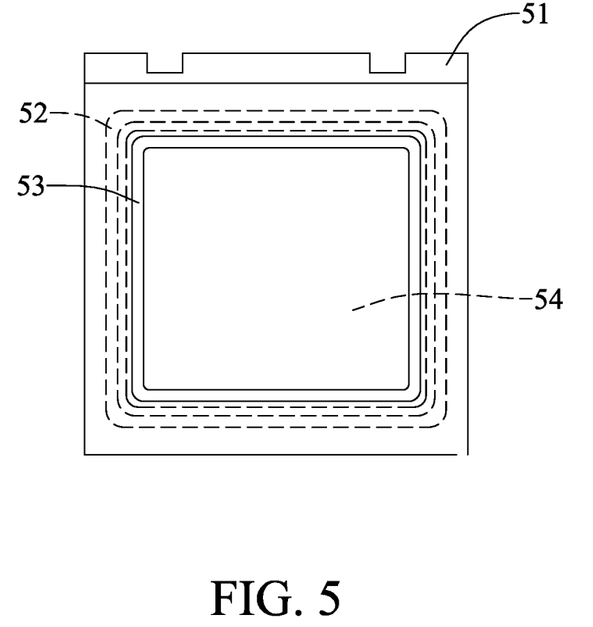
FIG. 5 is a front view of a combination of a stator and the winding frame structure in accordance with this invention.

Referring now to FIG. 5, a front view of a combination of a stator and the winding frame structure in accordance with this invention is shown. The heat generated by the windings 52 located between the two barrier plates 51 can be swiftly transmitted down into the four ceramic heat conductive structures 53, then to the stator 54 and the motor casing (not shown in the figure) via the ceramic heat conductive structures 53, and finally to be dissipated by an air-cooling or water-cooling apparatus (not shown in the figure). By providing such a heat-dissipation pathway to the electric motor equipped with the aforesaid winding frame structure of this disclosure, the radial temperature difference at the motor can be significantly reduced, a high thermal conductivity for the motor can be ensured, the winding arrangement during the manufacturing can be made easier, and the spatial utilization under a limited space and a desired heat-dissipation capacity can be easier optimized.

By providing the disclosure from FIG. 1 through FIG. 5, it is understood that this disclosure is to provide an integrated winding frame structure for motors equipped with high thermal-conductive structures as a single piece or an assembly that can reduce the thermal resistance between the copper wires and the stator by providing integrated insulation members for windings, and also by including special-structured grooves for the ceramic heat conductive plates with a high thermal conductivity. By having the winding frame structure for motors in this disclosure, the thermal contact resistance between the coppers and the stator can be significantly reduced, and a convenient winding arrangement for windings can be provided to the automation winding machine. In addition, in this disclosure, two barrier plates made of insulation materials are included, and the inner side of the windings includes plural ceramic heat conductive plates. Also, the heat dissipation area can be increased, and the related winding arrangement can be easier performed. In addition, by providing special-structured grooves to the outer surface of the ceramic heat conductive plate, the automation winding machine in a winding operation can easier process the winding arrangement. Compared to the conventional high thermal resistance interface device having simply an insulation jacket, the winding frame structure of this disclosure can rapidly conduct the heat generated by the copper wires to the silicon-steel plates and further to the casing of the motor; such that, with a relevant air-cooling or water-cooling system arranged upon the motor of this disclosure, the limited heat-dissipation capacity of the windings on the conventional air-cooled or water-cooled motor can substantially improved under a limited space for heat dissipation.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A winding frame structure for motors, comprising:
   two barrier plates, each of the two barrier plates having an engaging structure locating on a surface thereof facing the opposing barrier, the engaging structure further including four anchorage grooves;
   an insulation member, formed by four ceramic heat conductive structures, located between the two barrier plates, both ends of each of the four ceramic heat conductive structures being engaged with the corresponding engaging structures of the two barrier plates so as to form respective fixed engagement; and
   windings, wound around the four ceramic heat conductive structures between the two barrier plates;
   wherein an inner rectangular space for accommodating a stator is formed by the four ceramic heat conductive structures; and
   wherein the engaging structure further includes four protrusive members protruding toward a center of the corresponding barrier plate formed as a hollow rectangular frame structure, the four protrusive members being distributed to four inner corners of a hollow rectangular space of the corresponding barrier plate, three rivets being located to a root of each of the four protrusive members, each end of the four ceramic heat conductive structures being held between two neighboring protrusive members, a clip for providing elastic lateral compressive forcing upon the corresponding end of the respective ceramic heat conductive structure being introduced to be located in place at the root of the protrusive member with a restraint structure formed by the three rivets, such that a hollow rectangular cylinder is formed integrally by engaging the two barrier plates and the four ceramic heat conductive structures.

2. The winding frame structure for motors of claim 1, wherein each of the two barrier plates is made of an insulation material.

3. The winding frame structure for motors of claim 1, wherein each of the ceramic heat conductive structures is made of a material selected from a group of a ceramics, a graphite and a silicon glue.

4. The winding frame structure for motors of claim 1, wherein a surface of each of the four the ceramic heat conductive structures facing the windings includes one of a parallel rectangular groove structure and a parallel wavy groove structure.

5. The winding frame structure for motors of claim 1, wherein the engaging structure includes anchorage grooves for engaging the respective ends of the four ceramic heat conductive structures so as thereby to form integrally a hollow rectangular cylinder by engaging the two barrier plates and the four ceramic heat conductive structures.

6. The winding frame structure for motors of claim 5, wherein any two neighboring sides of the four ceramic heat conductive structures are not tightly contacted.

7. The winding frame structure for motors of claim 1, wherein any two neighboring sides of the four ceramic heat conductive structures are not tightly contacted.

* * * * *